Oct. 27, 1964   R. A. KUMMERER ETAL   3,153,897
CHAIN
Filed Dec. 26, 1961   2 Sheets-Sheet 1
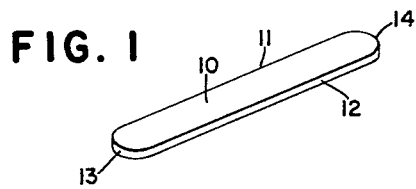
FIG. 1
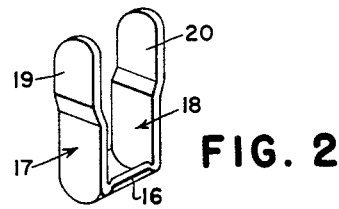
FIG. 2
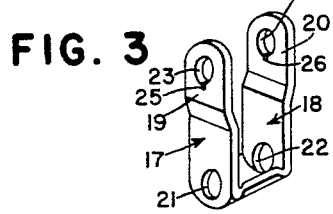
FIG. 3
FIG. 5
FIG. 4
FIG. 8
INVENTORS
RICHARD A. KUMMERER
ALFRED DEN BESTEN
JOSEPH T. CHESTER
BY
William A. Murray
ATTORNEY INVENTORS
RICHARD A. KUMMERER
ALFRED DEN BESTEN
JOSEPH T. CHESTER
BY
William A. Murray
ATTORNEY United States Patent Office 3,153,897
Patented Oct. 27, 1964

3,153,897
CHAIN
Richard A. Kummerer, Alfred Den Besten, and
Joseph T. Chester, Fulton, Ill.
Filed Dec. 26, 1961, Ser. No. 162,168
6 Claims. (Cl. 59—8)

This invention relates to a chain link and to a method of making a chain link of a new and novel nature which increases the ultimate life of the chain and eliminates many of the problems inherent in assembling conventional type chains.

In a pending application of Messrs. Richard A. Kummerer and Alfred Den Besten, Serial No. 101,867, and filed April 10, 1961, now Patent Number 3,054,301, there is therein shown and described a chain link formed by shaping a metal strap having a pair of holes adjacent a midportion and a pair of holes at opposite ends into a U-shaped link so that the holes adjacent the midportion and the respective ends are opposite one another. The holes receive transverse pivot pins which interconnect the links of the chain, and the arcuate portions are so formed that only a line contact exists between each pin and arcuate portion.

The present structure is a substantial improvement over the link described in the above application. In the aforementioned link the holes formed adjacent the midportion or bight of the U-shaped link create wear points adjacent the holes next to the bight. This is due to the fact the material of the link will stretch at its weakest point. Consequently, as the strap is formed into the U-shaped link, excessive deformation and stretching occurs in the material adjacent the holes. As a practical matter, the holes will elongate due to the deformation and even in some instances will deform at different degrees. Consequently, the holes at both the ends and adjacent the bight portion of the links often do not remain in perfect transverse alignment and the links inserted therein will be angularly disposed relative to one another and relative to the longitudinal dimension of the chain. This, of course, creates additional wear points on one end of the pins and on the link itself. Also, the fact that one link and its pins are not perfectly balanced generally effects wear points on those links in the chain which are balanced. Therefore, due to one poorly balanced link in the chain, every link in the chain is somewhat adversely affected. To partially compensate for this weakness, the holes for receiving the pins are normally made larger than the pins. However, sloppy or loose fit of the pins in the holes also creates problems of wear in the links and makes the exact length of chain difficult to predetermine within close tolerances.

Therefore, it is the primary object of the invention to provide a link and more specifically the method of making a link so that the holes for the pins are accurately placed in the sides of the links and are held to a rigid tolerance so as to snugly fit around the pins of the chain.

It is an object of the present invention to provide a method of making a chain link by forming an elongated metal strap into a desired U-shaped link; forming the bight portion into an arcuate shape, inserting the U-shaped strap over a male jig; positively forcing the bight or arcuate portion against one end of the jig; and simultaneously punching holes in the sides or legs of the U-shaped strap adjacent the open end and the closed end of the U-shaped strap.

It is still a further object of the invention to provide a U-shaped chain link having an arcuate shaped bight portion and a pair of circular and transversely aligned holes in the respective sides or legs of the link adjacent the bight portion with the edge periphery of each of the holes having a point lying on linear extensions of the line of contact between the connecting pin and the bight portion. The radius of the arcuate bight portion is considerably larger than the holes and consequently when a pin is inserted in the openings it will bear against the edges of the holes and against the bight portion along the single line of contact.

It is still a further object of the invention to provide a chain using the above chain links. The links are so formed that the open ends of one link will overlie the closed end of the adjacent link, and connecting pins extend through the holes at the free ends of each link and through the holes of the closed end of the adjacent link. The holes at the free ends are notched and the pins are spun at opposite ends so as to have portions thereof pressed into the notches of the outer holes while retaining the ability to rotate in the inner holes.

Other objects and advantages of the invention will become apparent to those skilled in the art as the invention is better understood from the following disclosure and as shown in the accompanying drawings.

FIGRE 1 is a perspective view showing a metal strap prior to the first operation of forming it into a chain link.

FIGURE 2 is a perspective view showing a metal strap after the first operation in forming it into a chain link.

FIGURE 3 is a perspective view of the completely formed chain link.

FIGURE 4 is a plan view partially in section of a chain as formed by the chain links.

FIGURE 5 is a sectional view taken substantially along the line 5—5 of FIGURE 4.

FIGURE 8 is a sectional view of the dies as taken along the line 8—8 of FIGURE 6.

Figure 6:
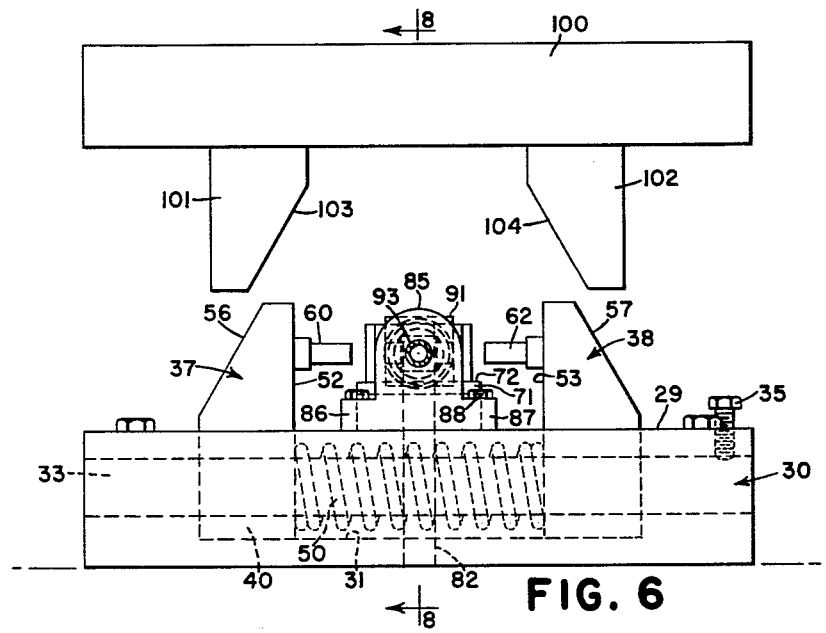
FIGURE 6 is a front view of the dies used to form the pin openings of the link as shown in FIGURE 3.

Referring now to the drawings, each link of the chain is formed from a single elongated metal strap 10, as shown in FIGURE 1, defined by opposite parallel edges 11, 12 extending to rounded ends 13, 14.

The first step in forming the link is to pass it through a forming die of a male and female variety which forms the strap into a U-shaped element, as shown in FIGURE 2, having a bight portion 16 closing one end of the link and opposed leg or side portions 17, 18 extending from the bight portion to free ends. The outer portions of the free ends are flared outwardly at 19, 20 to permit the links to overlap one another for purposes of interconnecting the adjacent links.

The die operation forming the strap into a U-shaped element is well known within the industry. A die somewhat similar to that used is shown in U.S. Patent 2,272,- 837 with certain exceptions. For example, the bight portion 16 of the present link is arcuate shaped and is formed about a transverse axis between the sides 17, 18 at a considerable distance, as indicated at r, from the bight 16. As is evident in FIGURE 5, the upper and lower edges of the bight 16 are substantially coplanar with the edges of the sides 17, 18. Also, the pins which interconnect the links are offset, in respect to the forming axis of the arcuate portions, toward the bight portions. This creates a line contact between the pins and bight portions, and the surfaces of the bight portions actually diverge from the surfaces of the respective pins. The point that is desired to be made here is that in a die operation of the type shown in U.S. Patent 2,272,-837 a male die section bears against the midportion of the strap 10 and drives it into a female die section ultimately to form the leg portions 17 and 18 and the central or bight portion 16 with the male die section bearing against the inner surface of the bight portion 16.

Figure 7:
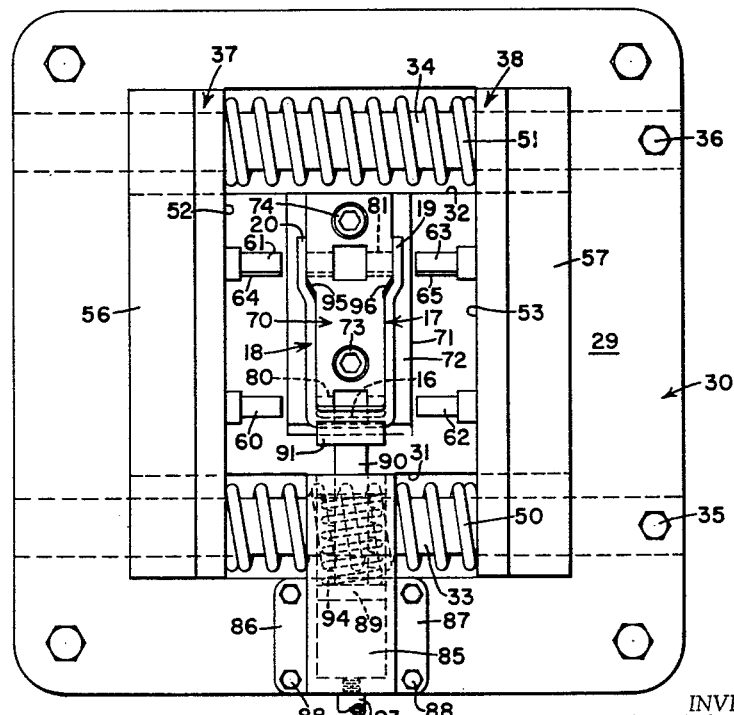
FIGURE 7 is a plan view of the lower portion of the dies shown in FIGURE 6.

In the operation of forming pin holes 21, 23 and 22, 24, as shown in FIGURE 3, the link is placed on an additional die or fixture as shown in FIGURES 6, 7, 8.

The die itself is composed of a main supporting structure or plate 30 with an upper surface 29 having a pair of U-shaped slots 31, 32 opening upwardly and extending transversely across the midsection of the plate 30. Extending completely across the plate 30 so as to be supported at opposite ends are a pair of parallel guide rods or tracks 33, 34. The midportions of the rods 33, 34 are disposed within the slots 31, 32 with the opposite ends thereof being retained in suitable openings in the sides of the supporting structure 30. The guide rods 33, 34 are held against movement by set screws 35, 36 respectively.

Carried on the guide rods 33, 34 are a pair of die supporting blocks 37, 38 extending longitudinally of the plate 30. Reviewing the structure of the block 37, it has a pair of depending integral lugs 40, 41 with U-shaped outer surfaces 44, 45 to conform to the U-shaped slots 31, 32 and circular openings 42, 43 by which the block rides on the tracks or rods 33, 34. A similar arrangement, not shown, is provided for the block 38. Consequently, the blocks 37, 38 may move toward or away from the center of the jig or fixture. A pair of coil springs 50, 51, carried on the tracks 33, 34, bear against opposed vertical faces 52, 53 of the respective blocks 37, 38. The blocks 37, 38 have inclined or beveled upper surfaces 56, 57 extending longitudinally of the respective blocks, the surfaces 56, 57 being inclined downwardly and outwardly as respects the center of the fixture.

Rigidly fixed to the block 37 and extending inwardly from the vertical face 57 are front and rear hole punching die tools 60, 61 used to punch the holes 22, 24 respectively. Similarly, hole punching die tools 62, 63 extend rigidly inwardly from the face 53 of the block 37 and are used to punch the holes 21, 23 respectively. The front tools 60, 62 and rear tools 61, 63 are in transverse alignment with one another. The rear tools 61, 63 have radial projections 64, 65 on their surfaces whereby the holes punched by the tools 61, 63 will have notches 26, 25 in their edges.

A link supporting die block 70 is provided at the center of the fixture. The die block 70 sits on a spacer plate 71 having an upper flat surface 72. The die 70 and spacer plate 71 rest on and are fixed to the main support plate 30 by means of bolts 73, 74 extending through suitable aligned openings in the die block or plate 70 and spacer plate 71 and being threadedly received in tapped openings 75, 76 in the main plate 30. The plate 71 extends outwardly at the front and both sides of the die block 70, and the surface 72 serves as a surface on which the edges of a link may lie.

The die block or plate 70 has vertical sides generally conforming to the inner surface of the sides 17, 18 of the links. It also has an arcuate shaped nose or forward end conforming to the shape of the internal surface of the bight portion 16 of the link. The die block 70 has front and rear transverse horizontal openings or tunnels 80, 81 for receiving the die tools 60, 62 and 61, 63 respectively upon the tools being moved inwardly. The die block 70, spacer plate 71, and main support plate 30 are provided with vertically aligned slug discharge openings, indicated in their entirety by the reference numerals 82, 83 communicating with the transverse openings 80, 81 so as to discharge the slugs cut from the chain links.

Due to the dies used in forming the link as shown in FIGURE 2 from the strap shown in FIGURE 1, the most uniform portion of all links is the arcuate shaped central or bight portion 16 and particularly in relation to the inner arcuate surface of the portion. Consequently, in cutting the pin holes 21–24 in a precise and uniform location in each link it is preferred to position the link in relation to the inner surface of the arcuate section 16. To do this there is provided on the forward end of the fixture an air cylinder 85 having horizontal flanges 86, 87 bolted at 88 to the main plate 30. Contained in the cylinder is a piston 89 with a rod 90 extending toward the forward end of the die block 70. The rod 90 carries at its extended end a shoe 91 with a rear inclined or beveled surface 92 adjacent to the nose of the die 70. An air conduit 93 is connected to the cylinder 85 and may effect pressure against the piston 89 to drive the shoe toward the die block 70. A coil spring surrounds the rod 90 between the piston 89 and end of the cylinder 85 and normally effects a biasing action on the piston 89 toward the opposite end of the cylinder.

The chain link is normally manually placed on the die block 70 with the piston 89 in its retracted position. Air pressure is then supplied to the cylinder to drive the shoe against the bight portion 16 of the link which in turn drives the latter against the nose of the die plate. The fact that the surface 92 of the shoe 91 is inclined causes a slight downward force on the chain link which causes it to seat properly on the surface 72 of the spacer plate 71. Since the inner surface of the arcuate portion 16 is the most uniform of all surfaces of the link due to the original die forming, the links placed on the die block 70 will be accurately and uniformly placed on the block. It will be noted the block 70 is recessed slightly at 95, 96 to permit the link to be seated against the nose of the block even though the individual links and particularly the flanged portions are not uniformly formed. This permits the openings 21, 22 to be very accurately cut and positioned in the link. Therefore, the holes 21, 22 may be cut closely to the size of the pins and may be disposed whereby the edges will have points on linear extensions of the line of contact between the respective pin and the arcuate portion 16. The holes 21, 22 will retain the pins in contact with the portions 16.

The tools 60–63 are driven inwardly from overhead by means of a support plate 100 which may be placed in a suitable power machine for raising and lowering. Rigidly depending from the underside of the support plate 100 is a pair of longitudinally extending blocks 101, 102 having inclined surfaces 103, 104 respectively generally of the angle of inclination of the surfaces 56, 57. When the support plate is lowered, the surfaces 103, 104 engage the surfaces 56, 57 and drive the tool supporting blocks 37, 38 inwardly to cause the tools 60–63 to cut the slugs from the sides 17, 18 of the link, thus leaving the holes 21, 22, 23, and 24. Upon the support plate 100 being raised the springs 50, 51 will cause the tool blocks 37, 38 to separate and clear the link. The air pressure in the cylinder 85 is released and the shoe 91 retarded, thereby making it possible to remove the link from the die block 70.

The individual links are formed into a chain by overlapping the flared ends 19, 20 of one link with the bight end of an adjacent link until the holes 23, 24 are in transverse registry with the holes 21, 22. A completely cylindrical shaped pin 110 is extended through the holes 21–24 and has opposite ends 111, 112 extending beyond the sides of the flared ends. The partially connected links are then placed in a spinning machine where the ends 111, 112 are spun into partially rounded heads as at 113, 114. This sequence of operation is shown in adjacent links in FIGURE 4. Also, by spinning the ends 111, 112 portions of the heads 113, 114 are forced into the notches 25, 26 which locks the pin 110 against rotation and does in fact form the link into a rigid unitary member with the bight portion 16 closing one end and the pin 110 closing the opposite end. Further, since the pin 110 has a considerably smaller radius than the inner arcuate surface of the bight portion, it will have line contact with that surface throughout its length. Since the pin is not movable relative to the flared ends 19, 20, it will not have a wear point or edge since it does bear against the arcuate surface.

It should here be understood that in both the present specification and claims the directional descriptions of parts, such as front, rear, transverse, upper, lower, and such, are used for purposes of convenience and are not meant or desired as words of limitations, it being fully recognized that all parts received their directional characteristics by the manner in which they are disposed or mounted.

While only one form of the invention has been shown, it should be recognized that other forms and variations will occur to those skilled in the art. Therefore, while the invention was shown in concise and detailed manner for purposes of illustrating the principles of the invention, it should be understood that there was no intention to limit or narrow the invention beyond the broad concept set forth in the appended claims.

What is claimed is:

1. A method of forming a chain link from an elongated metal strap having opposite elongated parallel edges extending between ends of the strap comprising: forming a central portion arcuately about an axis substantially parallel to the plane of the strap and bending the strap into a U-shaped member with oppositely disposed leg portions interconnected by the aforesaid central portion extending across one end; placing the U-shaped member on a die; forcing the central portion and leg portions to contact the die in a predetermined position; and forming transversely aligned holes at the free ends of the leg portions and transversely aligned holes in the leg portions closely adjacent the central portion.

2. A method of forming a chain link from an elongated metal strap having opposite elongated parallel edges extending between ends of the strap comprising: forming a central portion arcuately about an axis substantially parallel to the plane of the strap and bending the strap into a U-shaped member with oppositely disposed leg portions interconnected by the aforeside central portion extending across one end; placing the U-shaped member on a die; forcing the central portion and leg portions to contact the die in a predetermined position; and forming transversely aligned holes at the free ends of the leg portions and transversely aligned holes in the leg portions closely adjacent the central portion, the latter holes being round and having considerably smaller radii than the arcuate central portion, with the axis of the holes being offset toward the arcuate portion with regards to the axis of formation of the arcuate portion, and disposed in relation to the arcuate portion whereby the edge surfaces of the latter holes would include linear extensions of a straight line lying on the surface of the arcuate portion.

3. A method of forming a chain link from an elongated metal strap having opposite elongated parallel edges extending between ends of the strap comprising: forming a central portion arcuately about an axis substantially parallel to the plane of the strap and bending the strap into a U-shaped member with oppositely disposed leg portions interconnected by the aforesaid central portion at one end; placing the U-shaped member on a die with an arcuate shaped nose and sides conforming to the arcuate surface and side surfaces of the U-shaped member; forcing the central portion against the nose of the die to position the link on the die; and forming transversely aligned holes at the free ends of the leg portions and transversely aligned holes in the leg portions closely adjacent the central portion.

4. A method of making a chain comprising: forming a series of metal straps into U-shaped members, each having an arcuate bight portion and a pair of upright sides with upper and lower edges substantially coplanar with the upper and lower edges of the bight portion, the arcuate portion being formed about a transverse axis between the sides, and each of the sides further having outwardly flared end portions which will normally lie in overlapping relation to the sides of the next link and adjacent the bight portion, placing each link on a die plate having a nose at one end and upright sides conforming substantially to the internal surfaces of sides of the link, forcing the arcuate portions of each link against the nose so as to uniformly position each link relative to the die plate, cutting two pairs of transversely aligned pin-receiving holes in the sides of the link adjacent the bight portion and the flared portions respectively, the holes adjacent the bight portion having points on their edge surfaces in a straight line colinear relation with the inner surface of the arcuate portion; overlapping the links so that the holes in the flared ends of each link are in transverse registery with the holes adjacent the bight portion of the adjacent links; extending transverse cylindrical shaped pins through the aligned holes so that opposite ends project outwardly of the flared ends; simultaneously spinning heads on the projecting ends so as to lock the pin against rotation with respect to the flared ends while retaining a journal relation between the pins and the holes adjacent the arcuate portions, and line contacts between the arcuate portions and the pins.

5. A method of making a chain comprising: forming a series of metal straps into U-shaped members, each having an arcuate bight portion and a pair of upright sides with upper and lower edges substantially coplanar with the upper and lower edges of the bight portion, the arcuate portion being formed about a transverse axis between the sides, and each of the sides further having outwardly flared end portions which will normally lie in overlapping relation to the sides of the next link and adjacent the bight portion, placing each link on a die plate having a nose at one end and upright sides conforming substantially to the internal surfaces of sides of the link, forcing the arcuate portions of each link against the nose so as to uniformly position each link relative to the die plate, cutting two pairs of transversely aligned pin-receiving holes of the same diameter in the sides of the link adjacent the bight portion and the flared portions respectively, the holes adjacent the bight portion having points on their edge surfaces in a straight line colinear relation with the inner surface of the arcuate portion; overlapping the links so that the holes in the flared ends of each link are in transverse registry with the holes adjacent the bight portion of the adjacent links; extending transverse cylindrical shaped pins of the diameter of the holes through the aligned holes so that opposite ends project outwardly of the flared ends; simultaneously spinning heads on the projecting ends so as to lock the pin against rotation with respect to the flared ends while retaining a journal relation between the pins and the holes adjacent the arcuate portions, and line contacts between the arcuate portions and the pins.

6. A method of forming a chain link from an elongated metal strap comprising: forming a central portion arcuately about an axis substantially parallel to the plane of the strap and bending the strap into a U-shaped member with oppositely disposed leg portions interconnected by the aforesaid central portion at one end; placing the U-shaped member on a die with a nose and sides adapted for receiving the arcuate surface and side surfaces of the U-shaped member; forcing the central portion against the nose of the die to position the link on the die; and forming transversely aligned holes at the free ends of the leg portions and transversely aligned holes in the leg portions closely adjacent the central portion.

References Cited in the file of this patent

UNITED STATES PATENTS

| | | |
|---|---|---|
| 2,272,837 | Getz et al. | Feb. 10, 1942 |
| 2,594,552 | Granberg | Apr. 29, 1952 |
| 2,729,935 | Beck | Jan. 10, 1956 |
| 2,732,015 | Whistler et al. | Jan. 24, 1956 |
| 2,793,536 | Onulak | May 28, 1957 |
| 2,938,329 | Onulak | May 31, 1960 |
| 3,063,237 | Onulak | Nov. 13, 1962 |